(12) United States Patent
Adapa et al.

(10) Patent No.: US 12,394,988 B2
(45) Date of Patent: Aug. 19, 2025

(54) SYSTEM AND METHODS FOR CONTROLLING PHOTOVOLTAIC-POWERED HYDROGEN PRODUCTION PLANTS

(71) Applicant: Ohmium International, Inc., Newark, CA (US)

(72) Inventors: Anil Kumar Adapa, Tadepalligudem (IN); Gregory Kern, Arlington, CA (US); Rasool Aghatehrani, Redwood City, CA (US); Arne Ballantine, Incline Village, NV (US); Vidya Rangaswamy, San Diego, CA (US)

(73) Assignee: Ohmium International, Inc., Newark, CA (US)

( * ) Notice: Subject to any disclaimer, the term of this patent is extended or adjusted under 35 U.S.C. 154(b) by 0 days.

(21) Appl. No.: 18/666,241

(22) Filed: May 16, 2024

(65) Prior Publication Data
US 2024/0388101 A1    Nov. 21, 2024

Related U.S. Application Data

(60) Provisional application No. 63/466,951, filed on May 16, 2023.

(51) Int. Cl.
*H02J 3/38* (2006.01)
*H02J 3/46* (2006.01)
*H02S 40/30* (2014.01)

(52) U.S. Cl.
CPC ............... *H02J 3/381* (2013.01); *H02J 3/46* (2013.01); *H02S 40/30* (2014.12); *H02J 2300/26* (2020.01)

(58) Field of Classification Search
CPC ...... H02J 3/38; H02J 3/381; H02J 3/46; H02J 2300/26; H02S 40/30
See application file for complete search history.

(56) References Cited

U.S. PATENT DOCUMENTS

| | | |
|---|---|---|
| 2007/0246370 A1 | 10/2007 | Dimroth |
| 2021/0135455 A1 | 5/2021 | Marinopoulos et al. |
| 2022/0267917 A1* | 8/2022 | Zhang ...................... C25B 9/70 |

FOREIGN PATENT DOCUMENTS

| | | |
|---|---|---|
| CN | 107196418 A | 9/2017 |
| WO | WO 2024/238781 | 11/2024 |

OTHER PUBLICATIONS

PCT Application No. PCT/US2024/029676, International Search Report and Written Opinion dated Aug. 21, 2024.

\* cited by examiner

*Primary Examiner* — Robert L DeBeradinis
(74) *Attorney, Agent, or Firm* — Polsinelli LLP

(57) ABSTRACT

A system for controlling a photovoltaic (PV)-powered hydrogen production plant includes a plurality of PV modules to receive sunlight and output DC power, wherein the plurality of PV modules are combined in series to create a PV string, at least one power cabinet comprising at least one DC-to-DC power converter to receive DC power from the PV string and provide regulated DC power to an electrolyzer stack, the regulated DC power having regulated output current and/or voltage, and at least one controller to control the at least one DC-to-DC power converter to match the regulated DC power to requirements of the electrolyzer stack.

19 Claims, 5 Drawing Sheets

SYSTEM AND METHODS FOR CONTROLLING PHOTOVOLTAIC-POWERED HYDROGEN PRODUCTION PLANTS

CROSS-REFERENCE TO RELATED APPLICATIONS

This application claims the benefit of U.S. Provisional Application No. 63/466,951, filed May 16, 2023, for SYSTEM AND METHODS FOR CONTROLLING PHOTOVOLTAIC-POWERED HYDROGEN PRODUCTION PLANTS, which is incorporated herein by reference in its entirety.

TECHNICAL FIELD

The present disclosure relates to hydrogen production and, more specifically, to systems and methods for controlling photovoltaic-powered hydrogen production plants.

BACKGROUND

Photovoltaic power production converting solar energy to electrical energy occurs over a wide range of voltage and power. Hydrogen production plants could be loads for such electrical energy sources that are adjustable in power but typically require a limited input voltage operating range. However, equipment for connecting photovoltaic electric power production to a hydrogen production plant is not readily available. There are difficulties with controlling voltage and current input to the hydrogen production plant and adjusting hydrogen load and photovoltaic production power to optimally capture energy available from the photovoltaic electric power production.

Typical utility scale photovoltaic power plants operate up to 1,500 Volts DC, while maximum power from the plant is in a lower voltage range, e.g., in the range of 1,000 to 1,200 Volts DC. Typical photovoltaic power plants operate up to 1,500 Volts DC open circuit voltage, but future photovoltaic power plants will likely operate at higher voltages. A typical hydrogen polymer electrolyte membrane (PEM) electrolyzer stack will operate at constant current based on desired $H_2$ generation with a variable voltage up to 450 Volts DC. Current electrolyzer stacks operate at voltages much less than typical PV power plants, however. In the future it is possible that the optimal electrolyzer stack voltage may increase or decrease.

Photovoltaic power production with maximum power point tracking is available for delivering power into an energy sink such as an AC electric power system or DC batteries in bulk charging. In such systems, all of the energy available has a place to go. When charging batteries, and the load drops below the total power available, maximum power point chargers know how to back off on power and still finish battery charging. In the battery charging example, it is the battery that regulates the connected voltage. By contrast, in a hydrogen production plant, operating power level may be coordinated with auxiliary plant systems, such as pumps, driers, and coolers, to maintain safe plant operation. Input power should be delivered within a more limited voltage window.

SUMMARY

Methods and systems are disclosed that provide a cost-effective solution to power hydrogen production from a green energy source, such as solar photovoltaic (PV) power.

According to one aspect, a system for controlling a PV-powered hydrogen production plant includes a plurality of PV modules to receive sunlight and output DC power. The system also includes a plurality of PV combiners receive DC power from at least two PV modules of the plurality of PV modules and output combined DC power. The system further includes at least one PV re-combiner to receive combined DC power from at least two PV combiners of the plurality of PV combiners and output re-combined DC power. In addition, the system includes at least one PV converter comprising at least one DC-to-DC power converter to receive re-combined DC power and output regulated DC power, the regulated DC power having regulated output current and/or voltage. The system also includes at least one power cabinet comprising at least one additional DC-to-DC power converter to receive regulated DC power from the at least one PV converter and provide further regulated DC power to an electrolyzer stack, the further regulated DC power having further regulated output current and/or voltage. The system further includes at least one controller to control the at least one PV converter and the at least one power cabinet to match the regulated DC power and further regulated DC power to requirements of the electrolyzer stack.

According to another aspect, a system for controlling a PV-powered hydrogen production plant includes a plurality of PV modules to receive sunlight and output DC power, wherein the plurality of PV modules are combined in series to create a PV string. The system also includes at least one power cabinet comprising at least one DC-to-DC power converter to receive DC power from the PV string and provide regulated DC power to an electrolyzer stack, the regulated DC power having regulated output current and/or voltage. The system further includes at least one controller to control the at least one DC-to-DC power converter to match the regulated DC power to requirements of the electrolyzer stack.

According to another yet aspect, a system for controlling a PV-powered hydrogen production plant includes a plurality of PV modules to receive sunlight and output DC power. The system also includes a plurality of PV combiners receive DC power from at least two PV modules of the plurality of PV modules and output combined DC power. The system further includes at least one PV re-combiner to receive combined DC power from at least two PV combiners of the plurality of PV combiners and output re-combined DC power. In addition, the system includes at least one power cabinet comprising at least one DC-to-DC power converter to receive re-combined DC power from the at least one PV re-combiner and provide regulated DC power to an electrolyzer stack, the regulated DC power having regulated output current and/or voltage; and at least one controller to control the at least one DC-to-DC power converter.

BRIEF DESCRIPTION OF THE DRAWINGS

The accompanying drawings illustrate embodiments and/or aspects of the disclosure and, together with the written description, serve to explain the principles of the disclosure. Wherever possible, the same reference numbers are used throughout the drawings to refer to the same or like elements of an embodiment. Non-limiting and non-exhaustive descriptions are described with reference to the following drawings. The components in the figures are not necessarily to scale, emphasis instead being placed upon illustrating principles of the disclosed embodiments.

DETAILED DESCRIPTION

Figure 1:
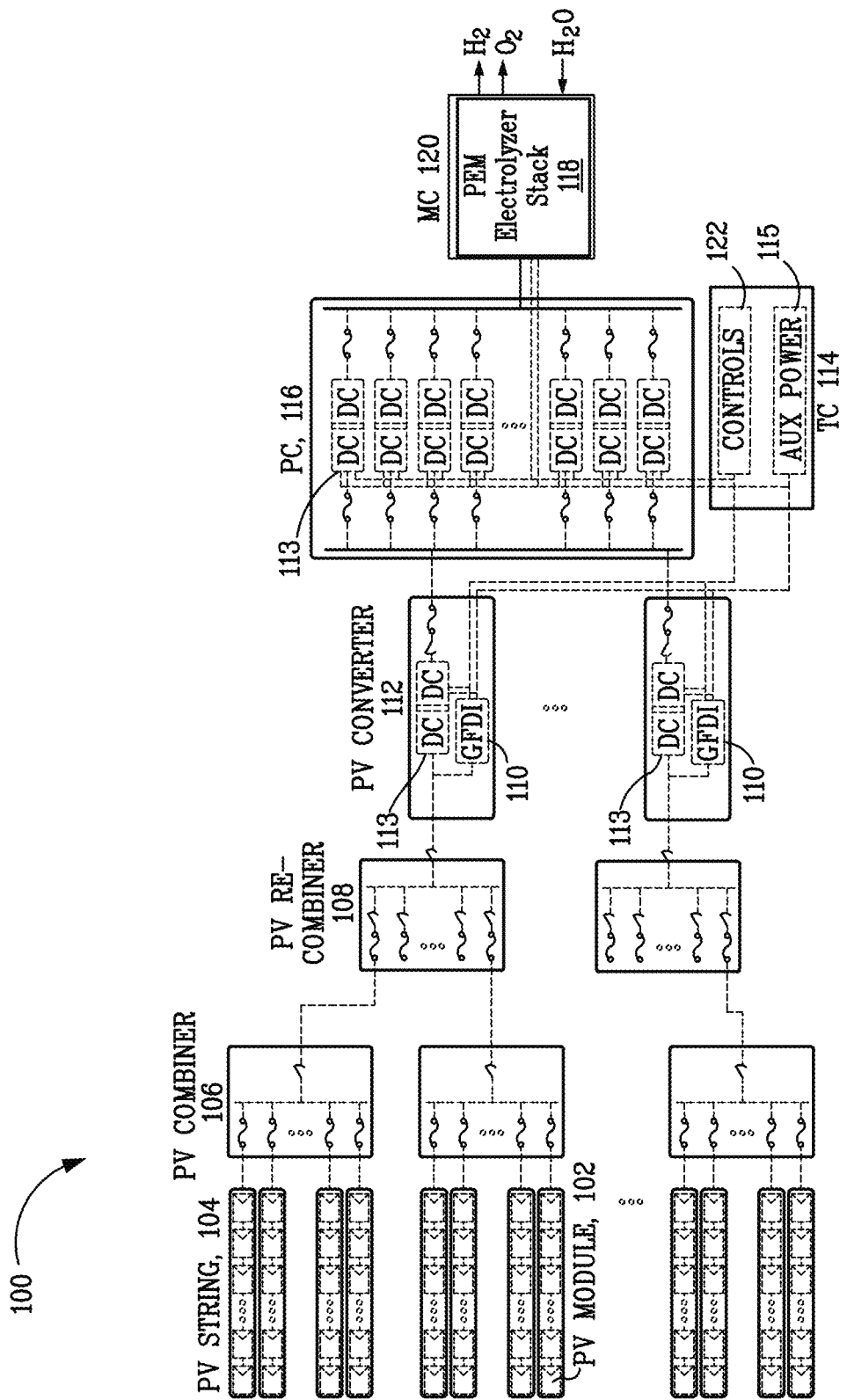
FIG. 1 is a schematic block diagram of a system for controlling photovoltaic-powered hydrogen production plants.

Reference is made to FIG. 1, which is a schematic block diagram of a system 100 for controlling photovoltaic-powered hydrogen production plants. The system 100 may include a PV module 102, which may be a complete, environmentally protected unit including solar photovoltaic (PV) cells, optics, and other components, exclusive of tracker circuitry, designed to generate DC power when exposed to sunlight. An example of a PV module 102 includes, without limitation, a US/Vertex 505 W+Bifacial available from Trina Solar. The PV module 102 may have a maximum open circuit voltage rating of 50 Volts and power rating of 500 Watts, and a maximum insulation working voltage rating of 1,500 Volts. The PV module 102 may be inherently short circuit current limited, depending on design, temperature, and amount of sunlight. No load, open circuit voltage may also be limited depending on design, temperature, and amount of sunlight.

A number of PV modules 102 may be wired in series to create a PV string 104. In one embodiment, the maximum number of PV modules 102 in a PV string 104 does not exceed either the module or the system maximum insulation working voltage rating. One or more PV strings 104 may be included in the system 100. In some embodiments, the system 100 may have up to 30 (or more) PV modules 102 in series, with a worst-case open circuit voltage of 1,500 Volts DC and Standard Test Conditions (STC) power rating of 15 kW.

The system 100 may further include at least one PV combiner 106, which is a unit that combines the parallel output of multiple PV strings 104. An example of a PV combiner 106 includes, without limitation, a Solectria XGI 1500 combiner. Fuses may be provided to protect PV strings 104 and cables from backflow overcurrent conditions. A switch disconnect may also be provided to aid service and installation of downstream components. The switch disconnect may or may not be rated for operation under load. One or more PV combiners 106 may be included in the system 100, each PV combiner 106 receiving the output of multiple (e.g., two or more) PV strings 104.

In certain embodiments, two or more PV strings 104 may be connected in parallel, without fuses, so long as the output cable is rated for the combined worst case short circuit current of both PV strings 104. This may be allowed because if two PV strings 104 were inadvertently connected in reverse, the current would be limited to the PV string 104 with the lower available short circuit current, which is described in connection with FIG. 3, below.

The system 100 may also include at least one PV re-combiner 108, which is a unit that combines the parallel output of multiple PV combiners 106. Structurally, a PV re-combiner 108 may be similar or identical to a PV combiner 106. Fuses may be provided to protect PV strings 104, PV combiners 106, and cables from backflow overcurrent conditions. Fused and circuit-breaker PV combiners 106 are available from Bentek. Switch disconnects may be provided to aid service and installation of up and downstream components. The switch disconnects may or may not be rated for operation under load. One or more PV re-combiners may be included in a system 100 to receive the output of multiple PV combiners 106. Re-combiners 108 may be optional for smaller systems and may be advantageous for larger systems. For example, a PV combiner 108 with hundreds of strings may be difficult to design and/or too expensive. Typical PV combiners 106 are available with 8, 12, 14, 16, 24 or 32 input strings configurations. The PV re-combiners 108 may be used to combine multiple PV combiners 106.

The system 100 may additionally include at least one PV converter 112, which is a unit suitable for connection to a PV source that includes a Ground Fault Detector/Interrupter (GFDI) 110 and a DC-to-DC power converter 113. The at least one GFDI 110 provides PV DC ground fault protection by sensing ground fault conditions on the connected PV input by either sensing ground fault current, ground leakage current or abnormal ground impedance of the PV source circuit. When a ground fault condition is detected, the DC-to-DC converter operation ceases, and alarm indication is provided through the controller and/or visible display.

The DC-to-DC power converter 113 is an electronic circuit or electromechanical device that converts a source of direct current (DC) from one voltage level to another. Examples of a DC-to-DC power converter 113 include, without limitation, a DPS-500 DC-to-DC Converter available from Dynapower and/or a DC-DC optimizer available from Alencon Systems. The DC-to-DC power converter 113 may also be electrically isolated from input to output.

The PV converter 112 (which may include, in some embodiments, a single DC-to-DC power converter 113) may be self-powered from either the input or output or powered from an auxiliary power input. A fuse may be provided on the output to provide overload and short circuit current protection. A switch disconnect may be provided on the output to aid service and installation of downstream components.

The PV converter 112 may have a control input/output that communicates operating data and control parameters. The unit may be capable of maximum power point tracking (MPPT) of PV power and regulating output voltage and/or current. One or more PV converters 112 may be included in the system 100, each of which may be connected to the output of a PV re-combiner 108 (or a PV combiner 106 in some embodiments). Each input of a PV converter 112 may include or be connected to one GFDI unit 110 in an embodiment.

The system 100 may further include a Telemetry Cabinet (TC) 114, which contains system level controls 122 (discussed below) that communicate with and control all components of the system 100, including the PV converter(s) 112. In some embodiments, the communication is Controller Area Network (CAN) communication, but may also be other forms of communication such as, without limitation, TCP/IP. The TC 114 also provides auxiliary control power 115 to other components in the system 100. Depending upon the load, such power may be 230/400V 50 Hz, 48 V DC or 24 V DC. The controls 122 may include one or more processors, which may be embodied as central processing units (CPUs), microcontrollers, field programmable gate arrays (FPGAs), or the like, as well as memory devices including, without limitation, random access memory (RAM), read-only memory (ROM), electronically erasable programmable read-only memory (EEPROM), and the like.

The system 100 may further include a Power Cabinet (PC) 116. The PC 116 may contain additional DC-to-DC power converters 113 that control power flow to an electrolyzer stack 118. This power flow is controlled, in one embodiment, by regulating output current. In some embodiments, output voltage may be limited to 450 V DC and output current may be limited to 1,000 A DC. In some embodiments, 450 V DC is the maximum voltage of the electrolyzer stack. In other configurations, the voltage may range from 400 V to 500 V depending on the number of cells, and the current may range from 1000 A to 1500 A. In certain embodiments, each DC-to-DC power converter 113 is electrically isolated from input to output to protect the electrolyzer stack 118 from external surges; and, input voltage is nominally 800 V DC, +10 percent/−15 percent.

Figure 2A:
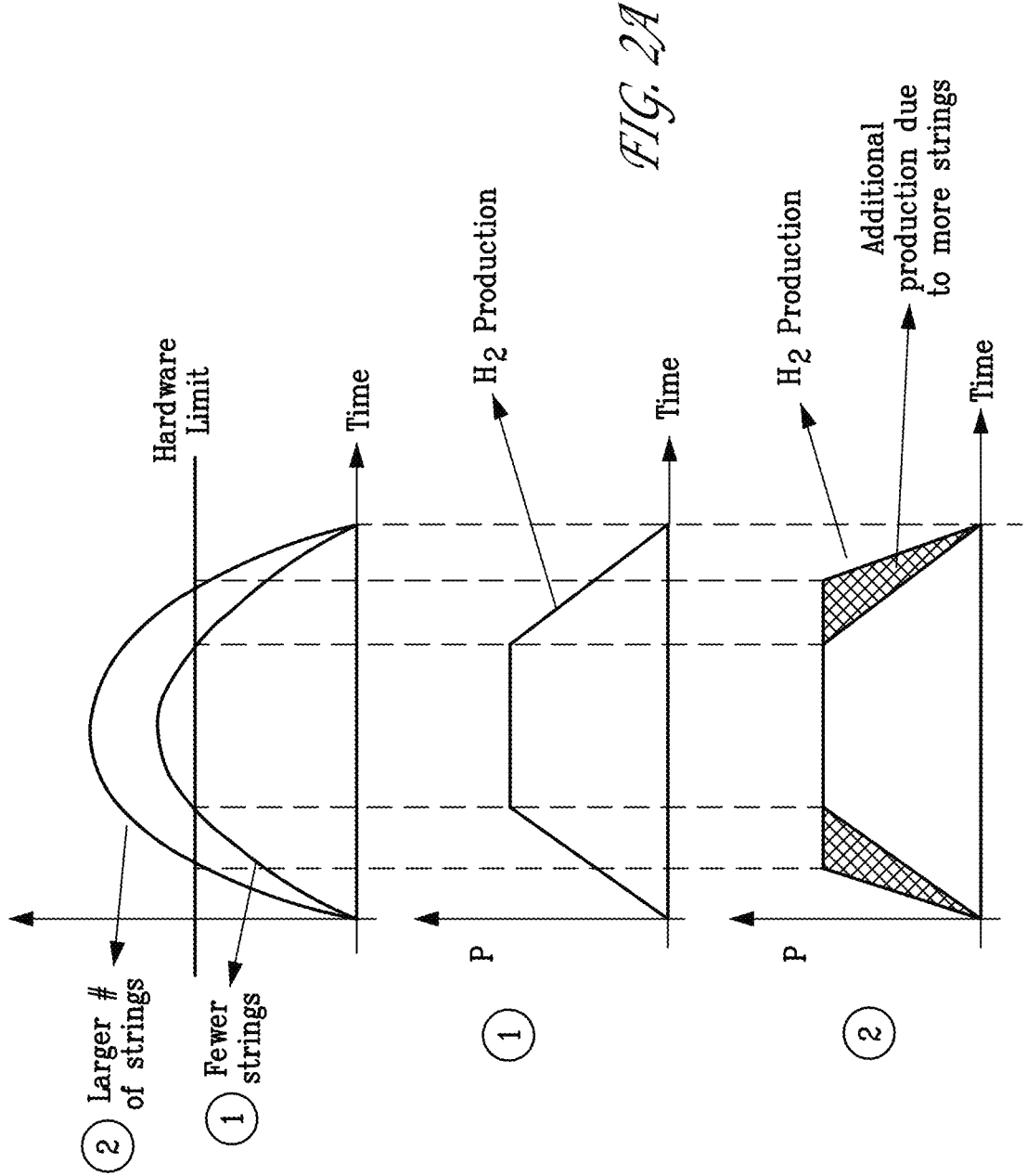
FIG. 2A is a graph of the tradeoff in hydrogen production by using more or fewer photovoltaic strings.

In one embodiment, the PC 116 includes N+M DC-to-DC power converters 113. N may be the minimum number of DC-to-DC power converters 113 needed to meet the desired power rating. For example, if the system power rating is 300 kW and each DC-to-DC power converter 113 is 30 KW, then N would be 10. M number of additional units are provided for excess capacity in case PV strings 104 cannot deliver full power due to ambient temperature or solar irradiance, and for N+1 type redundancy for high reliability system availability. In some embodiments, there may be 10%-30% additional units. For example, a tradeoff may exist between Capex (additional strings) and Opex or returns (maximizing Hydrogen production), as shown in FIG. 2A.

With continued reference to FIG. 1, the system 100 may also include a Hydrogen Cabinet (HC) 120, which contains the electrolyzer stack 118. The electrolyzer stack 118 may be a Proton Exchange Membrane (PEM) electrolyzer stack, an Anion Exchange Membrane (AEM) electrolyzer stack, or a combination thereof. The electrolyzer stack 118 takes electrical current and water ($H_2O$) as input and produces gaseous hydrogen ($H_2$) and oxygen ($O_2$).

In one embodiment, the system 100 further includes one or more controls 122 within the TC 114, which may be a combination of hardware and software for control of the entire system 100 including the PV converter(s) 112. Input voltage to the PC 116 may be controlled to a relatively tight voltage window for proper operation of the system 100. The PC 116 itself is essentially a load to the photovoltaic source and does not regulate input voltage in one embodiment.

In the embodiment shown in FIG. 1, the PV converter 112 may be capable of regulating its output voltage. The controls 122 may regulate PC 116 output current to the electrolyzer stack 118. In one embodiment, the PV converter 112 is capable of Maximum Power Point Tracking (MPPT) of the PV input power, but only so long as the PC 116 and HC 120 have capacity to accept that power. MPPT uses a DC-to-DC power converter 113 that takes DC input from the PV input, changes it to AC and converts it back to a different DC voltage and current to match the PV input to a battery or DC load. There may be an additional control loop in the controls to provide stability in power flow. This stability in power flow can be provided by operating on a droop principle according to FIG. 2.

As an example, the PV strings 104 may produce up to between 1500 V and 1600 V in some embodiments. Likewise, the PV combiner 106 and PV re-combiners may receive and output up to between 1500 V and 1600 V. The PV converters 112 may have a maximum input of 1600V and produce approximately 800 V output. The PC 116 may receive from 700 V to 900 V input and provide from 400 V to 500 V output. The HC 120 may receive from 0 to 1500 A and up to 500 V. The controls 122 may give an operating current command to power supplies depending on the demand and maximum available solar power. The controls 122 also monitor the health of HC 120 and, if necessary, limit the current with in the operable limits.

Advantageously, the hardware PC 116 can be effectively utilized and the PC 116 need not track the maximum power point (MPP) in this embodiment. The PC 116 can be operated close to the maximum input voltage, thus maximizing the power transfer from the PV converter 112 to the electrolyzer stack 118 for the hardware with a given current limit.

Figure 2B:
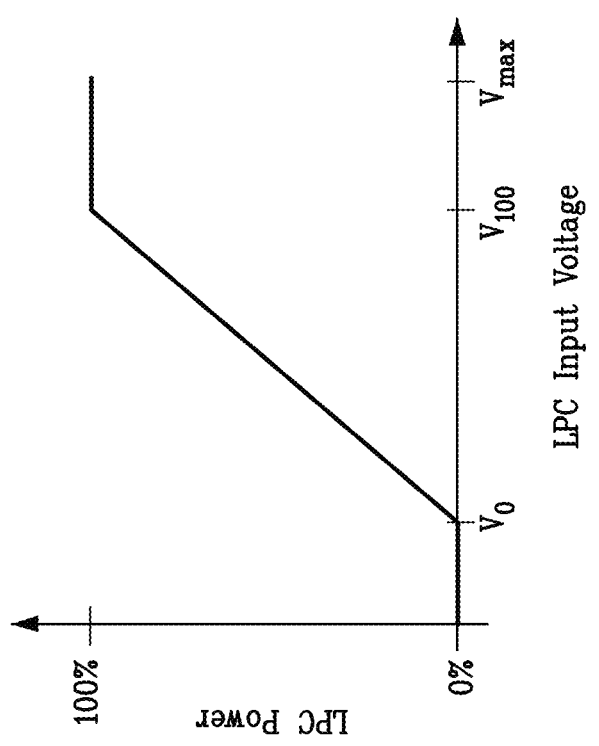
FIG. 2B is a graph of power vs. input voltage in a droop operation.

FIG. 2B is a graph of power vs. input voltage in a droop operation. Below PC input voltage $V_0$, there is no output current or power flow from the PC 116. For PC input voltages between $V_0$ to $V_{100}$, output current of the PC 116 follows the droop curve of FIG. 2B. When PC input voltage exceeds $V_{100}$, output current remains fixed at 100 percent. If PC voltage exceeds $V_{max}$, then the PC 116 turns off for self-protection.

In one embodiment, the controls 122 of FIG. 1 will control the PV converter 112 to also operate according to the droop curve of FIG. 2B. As PV power level changes, the PV converter 112 is commanded to adjust regulated output voltage according to the droop curve. For example, a typical system may operate with $V_0$=700 V, $V_{100}$=800 V and $V_{max}$=850 V, and may be adjusted as needed.

Additionally, the PC 116 may need to limit output current based on system requirements, in which case the load is less than available power. Another condition that may occur is when clouds move in, thereby blocking the sun, to reduce PV power and PV available power drops to below the load power of the system 100. In this case the output voltage of the PV converter 112 will drop, causing the system power level to drop and come back into balance.

Software associated with the controls 122 may provide this power balance control. The software is stored in the memory device(s) described above and is executed by the processor(s) associated with the controls 122. It does so by controlling the output voltage of the PV converter 112 and controlling output current of the PC 116. The PC 116 may measure input and output voltage and power of the PV converter 112 and the PC 116. The PC 116 may additionally shut down and start up system operation based on system level needs. The PC controls software may use control feedback methods, such as proportional and or integral and or derivative controls to obtain these objectives. The software associated with the controls 122 may also use nonlinear control methods to meet these objectives. The software may also use feed forward technology that may cause input PV power to immediately reduce PC output current to prevent voltage collapse on PV system voltage. The software may adjust PV system voltage in order to provide MPPT when the electrolyzer stack 118 is capable of operating at higher power levels than what is being provided by the PV system.

Figure 3:
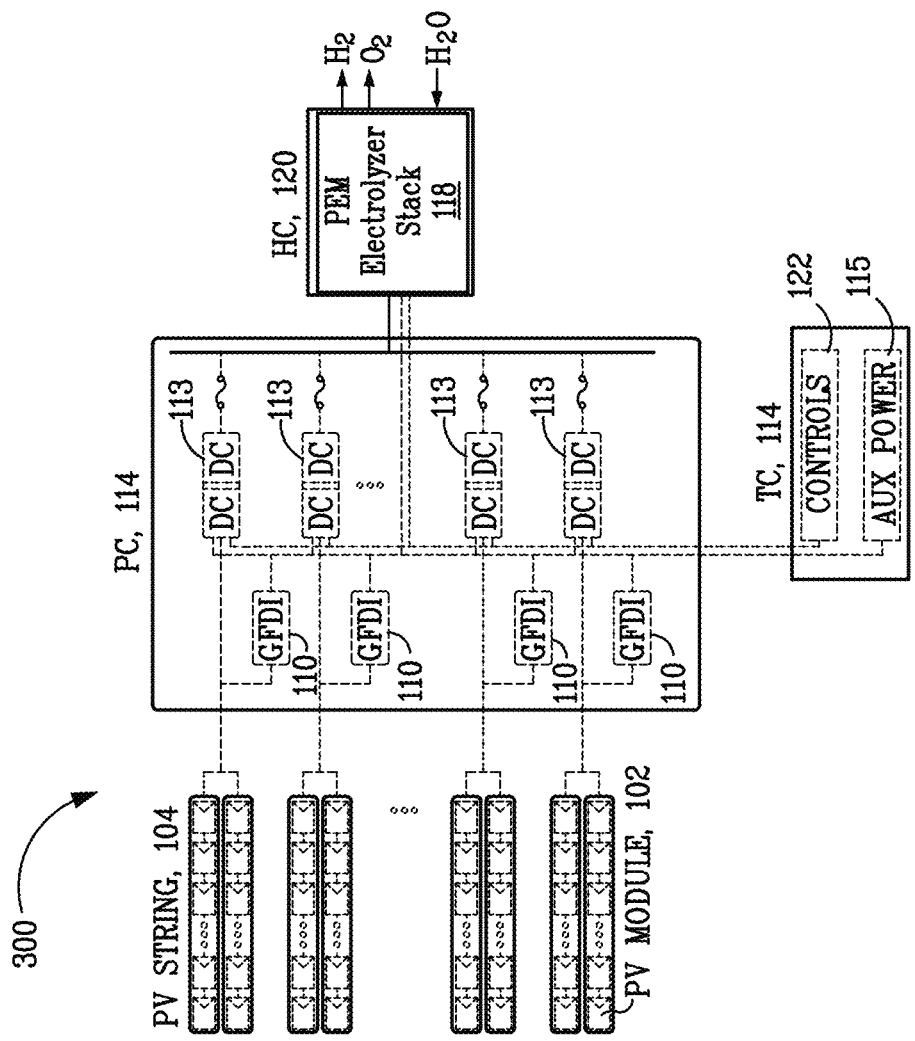
FIG. 3 is a schematic block diagram of a system for controlling photovoltaic-powered hydrogen production plants.

Reference is now made to FIG. 3, which is a block diagram of a system 300 for controlling photovoltaic-powered hydrogen production plants. In this embodiment, each PV string 104, or parallel combination of two PV strings 104, is wired directly to each DC-to-DC power converter 113 in the PC 116. Typically, two PV strings 104 at 15 KW each will be connected to each DC-to-DC power converter 113 at 30 KW each. Deterioration or partial shading of one of the PV strings 104 may limit the power from other PV strings 104. Although there is no limitation on the number of parallel connected PV strings 104, fewer strings may give more granularity in terms of number of MPPs and addressing the partial shading effects. In a large system, if there are errors in the tracking, or shading conditions that affect some strings compared to other strings, or differences in aging or soiling of PV source circuits, more granular MPPT can capture more energy from the system overall.

In this option, one GFDI 110 is paired with each PV input and associated DC-to-DC power converter 113. If a ground fault is detected in part of the PV system, it will not cause the entire system to shut down. This also makes it easier for service personnel to locate and detect a ground fault when the scope of the fault is known to be one or two PV strings 104.

Another benefit of this approach versus the embodiment of FIG. 1 is that there is only one DC-to-DC power conversion stage between the PV and electrolyzer stack 118, therefore power conversion efficiency can be higher. Yet another benefit is the lower total system cost. Many of the components in the embodiment of FIG. 1 are eliminated. Power is still delivered at 1500 V from the PV strings 104 to the PC 116, minimizing power cable conduction losses.

Figure 4:
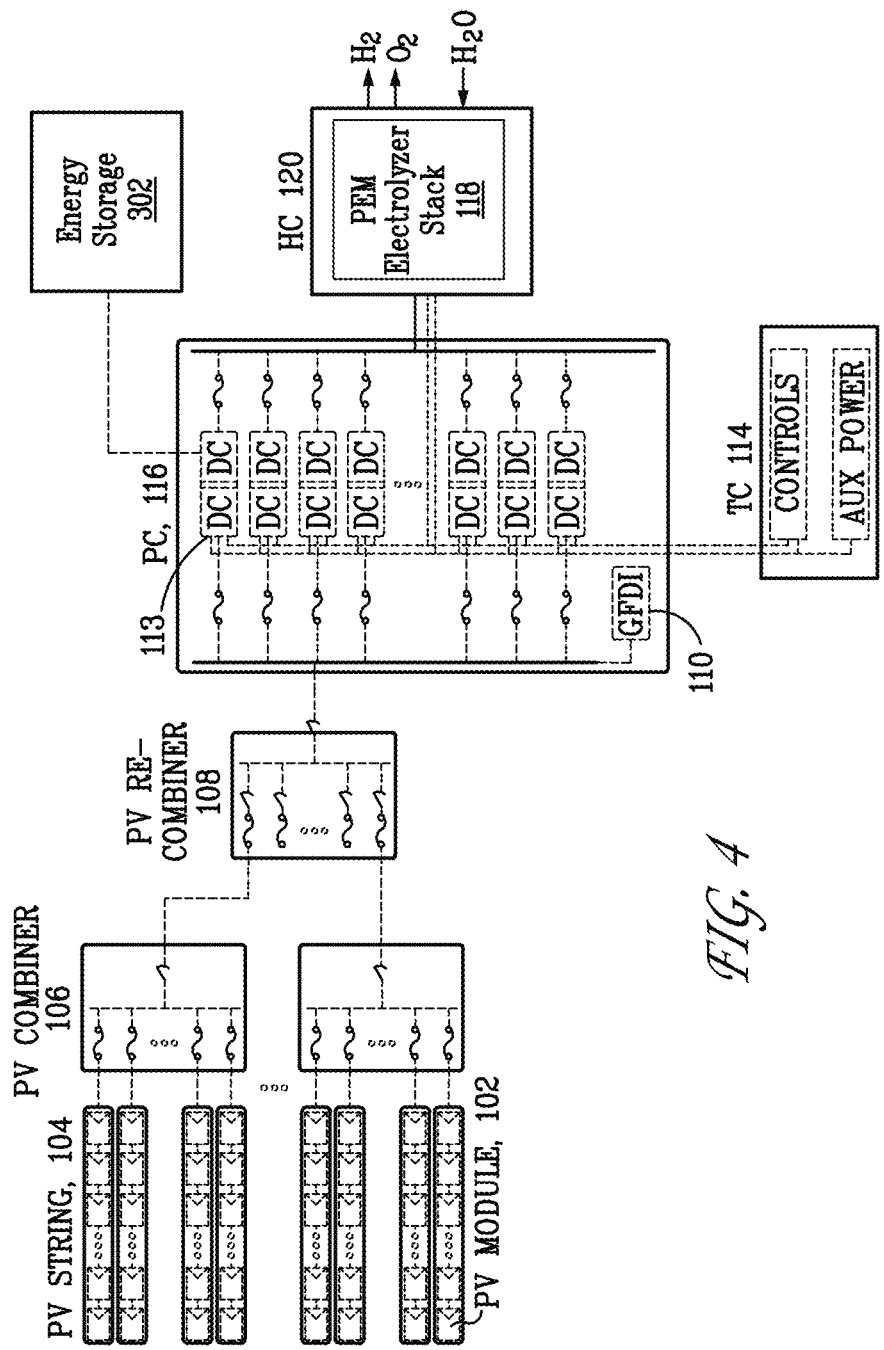
FIG. 4 is a schematic block diagram of a system for controlling photovoltaic-powered hydrogen production plants.

Reference is now made to FIG. 4, which is a block diagram of a system 400 for controlling photovoltaic-powered hydrogen production plants. The embodiment of FIG. 4 is similar to the embodiment of FIG. 1, except that the PV converter has been removed, a GFDI 110 is added to the PC 116, and the PV system is directly connected to the PC 116, which is modified to accept such direct connection.

The DC-to-DC power converters 113 may be isolated from input to output. This allows paralleling and isolation of DC-to-DC power converters 113. Another benefit of this approach versus the embodiment of FIG. 1 is that there is only one DC-to-DC power conversion stage between the PV strings 104 and electrolyzer stack 118, therefore conversion efficiency can be higher. Advantageously, the electrical isolation of the electrolyzer from the PV strings 104 will help in inhibiting the electrical hazards like impulse voltages or lightning strikes reaching the electrolyzer. This is a desired feature for the equipment that are working with highly combustible gases at high pressure. The electrical isolation eases parallel operation of converters by limiting the circulating currents. The number of parallel connected power supplies can be chosen based on the load requirement, which is current in applications like electrolyzers.

Yet another benefit is lower total system cost. The large PV converter 112 in the embodiment of FIG. 1 is eliminated. Power may be delivered at 1500 V from the PV strings 104 through the PV combiner(s) 106 and PV re-combiner(s) 108 to the system 400. Delivering power at the highest voltage possible reduces the conductor cost and losses for the cable runs connecting the system 400.

In summary, the disclosure connects a photovoltaic power system to a hydrogen electrolyzer stack through one or more DC-to-DC power converters with controls for optimal energy capture. The disclosure includes a system and method of control whereby available energy in a photovoltaic power system is delivered into a hydrogen electrolyzer stack through one or more DC-to-DC power converters. The control system performs one or more of the following functions:

1. Adjusts the DC-to-DC conversion ratio to obtain the desired operating points of photovoltaic power system voltage and hydrogen electrolyzer stack voltage in order to achieve a desired operating power point.
2. Coordinates operating power level of the system with safe operation of the balance of plant components, such as pumps, driers, and cooling units.
3. Adjusts the power level of the system to optimally capture available energy from the photovoltaic power system.
4. Monitors the photovoltaic system for abnormal ground fault indications and shutdown operation when appropriate.

In one embodiment, individual PV modules, or groups of modules, may have their own maximum power point tracking DC-to-DC converter optimizers. In another embodiment, the output of multiple DC-to-DC power converters may be connected to form a bus which is then connected in the system. In yet another embodiment, DC-to-DC power converters may be connected in series and or in parallel in the system.

In alternative embodiments, the system includes alternate energy storage 302. Energy storage 302 allows the hydrogen power plant to operate continuously, near peak capacity even when PV power is not available. The alternate energy storage may be a battery, a flywheel, a thermal power storage unit, and a gravity power storage unit, etc., and may be connected, in one embodiment, to the PC 116. In some embodiments the stored energy from alternate sources may be injected by another power electronics converter in DC form at the input of PC 116.

In one embodiment, more than one DC-DC power converter 113 may be provided in the system. For example, individual PV modules, or groups of modules, may have their own maximum power point tracking DC-to-DC converter optimizers. As another example, individual PV module strings, or groups of strings, may have their own maximum power point tracking DC-to-DC converter optimizers. As still another example, the output of multiple DC-to-DC power converters 113 may be connected to form a bus which is then connected in the system. In yet another example, DC-to-DC power converters 113 may be connected in series and or in parallel in the system.

In another embodiment, more than one hydrogen electrolyzer stack 118 may be provided in the system. Electrolyzer stacks 118 may be combined in series or parallel to meet the appropriate voltage and power requirements.

In still another embodiment, more than one PV Power Plant is connected in a system, where each PV Power Plant operates at independent voltage and power points.

In yet another embodiment, one or more DC-to-DC power converters 113 are electrically isolated from input to output. Electrical isolation between the input power source and the electrolyzer stack 118 is desirable to protect the electrolyzer stack 118 from electrical surges outside the system.

Numerous examples are provided herein to enhance understanding of the present disclosure. A specific set of statements is provided as follows.

Statement 1. A system for controlling a photovoltaic (PV)-powered hydrogen production plant comprising: a plurality of PV modules to receive sunlight and output DC power; a plurality of PV combiners receive DC power from at least two PV modules of the plurality of PV modules and output combined DC power; at least one PV re-combiner to receive combined DC power from at least two PV combiners of the plurality of PV combiners and output re-combined DC power; at least one PV converter comprising at least one DC-to-DC power converter to receive re-combined DC power and output regulated DC power, the regulated DC power having regulated output current and/or voltage; at least one power cabinet comprising at least one additional DC-to-DC power converter to receive regulated DC power from the at least one PV converter and provide further regulated DC power to an electrolyzer stack, the further regulated DC power having further regulated output current and/or voltage; and at least one controller to control the at least one PV converter and the at least one power cabinet to match the regulated DC power and further regulated DC power to requirements of the electrolyzer stack.

Statement 2. The system of statement 1, wherein each DC-to-DC power converter of the at least one power cabinet is electrically isolated from input to output to protect the electrolyzer stack.

Statement 3. The system of statement 1, wherein the at least one power cabinet includes N+M DC-to-DC power converters, wherein N is a minimum number of DC-to-DC power converters needed to meet a desired power rating and M comprises a number of additional units to provide excess capacity in case the plurality of PV modules cannot deliver full power.

Statement 4. The system of statement 1, wherein the at least two PV modules are combined in series as a PV string.

Statement 5. The system of statement 1, wherein each PV converter includes or is coupled to a Ground Fault Detector/Interrupter (GFDI).

Statement 6. The system of statement 1, wherein: the at least one PV converter comprises a Maximum Power Point Tracking (MPPT) controller; and the at least one PV converter provides the regulated DC power using droop control.

Statement 7. The system of statement 1, further comprising alternate energy storage coupled to the at least one power cabinet to provide continuous power to the electrolyzer stack when sunlight is not available, wherein the alternate energy storage includes at least one of a battery, a flywheel, a thermal power storage unit, and a gravity power storage unit.

Statement 8. A system for controlling a photovoltaic (PV)-powered hydrogen production plant comprising: a plurality of PV modules to receive sunlight and output DC power, wherein the plurality of PV modules are combined in series to create a PV string; at least one power cabinet comprising at least one DC-to-DC power converter to receive DC power from the PV string and provide regulated DC power to an electrolyzer stack, the regulated DC power having regulated output current and/or voltage; and at least one controller to control the at least one DC-to-DC power converter to match the regulated DC power to requirements of the electrolyzer stack.

Statement 9. The system of statement 8, wherein each DC-to-DC power converter is electrically isolated from input to output to protect the electrolyzer stack.

Statement 10. The system of statement 8, wherein the at least one power cabinet includes N+M DC-to-DC power converters, wherein N is a minimum number of DC-to-DC power converters needed to meet a desired power rating and M comprises a number of additional units to provide excess capacity in case the plurality of PV modules cannot deliver full power.

Statement 11. The system of statement 8, wherein each DC-to-DC power converter includes or is coupled to a Ground Fault Detector/Interrupter (GFDI).

Statement 12. The system of statement 8, wherein the at least one DC-to-DC power converter comprises a Maximum Power Point Tracking (MPPT) controller and provides the regulated DC power using droop control.

Statement 13. The system of statement 8, further comprising alternate energy storage coupled to the at least one power cabinet to provide continuous power to the electrolyzer stack when sunlight is not available, wherein the alternate energy storage includes at least one of a battery, a flywheel, a thermal power storage unit, and a gravity power storage unit.

Statement 14. A system for controlling a photovoltaic (PV)-powered hydrogen production plant comprising: a plurality of PV modules to receive sunlight and output DC power; a plurality of PV combiners receive DC power from at least two PV modules of the plurality of PV modules and output combined DC power; at least one PV re-combiner to receive combined DC power from at least two PV combiners of the plurality of PV combiners and output re-combined DC power; at least one power cabinet comprising at least one DC-to-DC power converter to receive re-combined DC power from the at least one PV re-combiner and provide regulated DC power to an electrolyzer stack, the regulated DC power having regulated output current and/or voltage; and at least one controller to control the at least one DC-to-DC power converter to match the regulated DC power to requirements of the electrolyzer stack.

Statement 15. The system of statement 14, wherein each DC-to-DC power converter of the at least one power cabinet is coupled to a common Ground Fault Detector/Interrupter (GFDI).

Statement 16. The system of statement 14, wherein each DC-to-DC power converter is electrically isolated from input to output to protect the electrolyzer stack.

Statement 17. The system of statement 14, wherein the at least one power cabinet includes N+M DC-to-DC power converters, wherein N is a minimum number of DC-to-DC power converters needed to meet a desired power rating and M comprises a number of additional units to provide excess capacity in case the plurality of PV modules cannot deliver full power.

Statement 18. The system of statement 14, wherein: the at least one DC-to-DC power converter comprises a Maximum Power Point Tracking (MPPT) controller; and the at least one DC-to-DC power converter provides the regulated DC power using droop control.

Statement 19. The system of statement 14, further comprising alternate energy storage coupled to the at least one power cabinet to provide continuous power to the electrolyzer stack when sunlight is not available.

Statement 20. The system of statement 19, wherein the alternate energy storage includes at least one of a battery, a flywheel, a thermal power storage unit, and a gravity power storage unit.

Embodiments of the present disclosure may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a FLASH memory, a flexible disk, a hard disk, any other magnetic medium, any other optical medium, RAM, PROM, EPROM, a FLASHEPROM, and any other memory chip or cartridge.

Aspects of the present disclosure are set forth in the following description and related figures directed to specific embodiments. Those of skill in the art will recognize that alternate embodiments may be devised without departing from the scope of the appended claims. Additionally, well-known elements will not be described in detail or will be omitted so as not to obscure more relevant details.

As used herein, the word exemplary means serving as an example, instance, or illustration. The embodiments described herein are not limiting but rather are exemplary only. The described embodiments are not necessarily to be construed as preferred or advantageous over other embodiments. Moreover, the terms "embodiments of the invention," "embodiments," or "invention" do not require that all embodiments include the discussed feature, advantage, or mode of operation.

Further, many of the embodiments described herein are described in sequences of actions to be performed by, for example, elements of a computing device. Those skilled in the art will recognize that specific circuits can perform the various sequence of actions described herein (e.g., application-specific integrated circuits or "ASICs") and/or by program instructions executed by at least one processor. Additionally, the sequence of actions described herein can be embodied entirely within any form of non-transitory computer-readable storage medium. The execution of the sequence of actions enables the processor to perform the functionality described herein. Thus, the various aspects of the present disclosure may be embodied in several different forms, all of which have been contemplated to be within the scope of the claimed subject matter. In addition, for each of the embodiments described herein, the corresponding form of any such embodiments may be described herein as, for example, a computer configured to perform the described action.

When listing various aspects of the products, methods, or system described herein, any feature, element, or limitation of one aspect, example, or claim may be combined with any other feature, element, or limitation of any other aspect when feasible (i.e., not contradictory).

As used herein, the singular forms "a," "an," and "the" include plural references unless the context clearly dictates otherwise. Although any systems and methods similar or equivalent to those described herein can be used to practice or test embodiments, only some exemplary systems and methods are now described. It should be understood that the embodiments are intended to be open-ended in that an item or items used in the embodiments is not meant to be an exhaustive listing of such items or items or meant to be limited to only the listed item or items.

While various flow diagrams provided and described above may show a particular order of operations performed by certain embodiments of the invention, it should be understood that such order is exemplary (e.g., alternative embodiments can perform the operations in a different order, combine certain operations, overlap certain operations, etc.).

The foregoing detailed description of the technology herein has been presented for purposes of illustration and description. It is not intended to be exhaustive or to limit the technology to the precise form disclosed. Many modifications and variations are possible in light of the above teachings. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims.

What is claimed is:

1. A system for controlling a photovoltaic (PV)-powered hydrogen production plant comprising:
    a plurality of PV modules to receive sunlight and output DC power, wherein the at least two PV modules are combined in series as a PV string;
    a plurality of PV combiners to receive DC power from at least two PV modules of the plurality of PV modules and output combined DC power;
    at least one PV re-combiner to receive combined DC power from at least two PV combiners of the plurality of PV combiners and output re-combined DC power;
    at least one PV converter comprising at least one DC-to-DC power converter to receive re-combined DC power and output regulated DC power, the regulated DC power having regulated output current and/or voltage;
    at least one power cabinet comprising at least one additional DC-to-DC power converter to receive regulated DC power from the at least one PV converter and provide further regulated DC power to an electrolyzer stack, the further regulated DC power having further regulated output current and/or voltage; and
    at least one controller to control the at least one PV converter and the at least one power cabinet to match the regulated DC power and further regulated DC power to requirements of the electrolyzer stack.

2. The system of claim 1, wherein each DC-to-DC power converter of the at least one power cabinet is electrically isolated from input to output to protect the electrolyzer stack.

3. The system of claim 1, wherein the at least one power cabinet includes N+M DC-to-DC power converters, wherein N is a minimum number of DC-to-DC power converters needed to meet a desired power rating and M is a number of additional units to provide excess capacity in case the plurality of PV modules cannot deliver full power.

4. The system of claim 1, wherein each PV converter includes or is coupled to a Ground Fault Detector/Interrupter (GFDI).

5. The system of claim 1, wherein:
    the at least one PV converter comprises a Maximum Power Point Tracking (MPPT) controller; and
    the at least one PV converter provides the regulated DC power using droop control.

6. The system of claim 1, further comprising alternate energy storage coupled to the at least one power cabinet to provide continuous power to the electrolyzer stack when sunlight is not available, wherein the alternate energy storage includes at least one of a battery, a flywheel, a thermal power storage unit, and a gravity power storage unit.

7. A system for controlling a photovoltaic (PV)-powered hydrogen production plant comprising:
    a plurality of PV modules to receive sunlight and output DC power, wherein the plurality of PV modules are combined in series to create a PV string, wherein the at least two PV modules are combined in series as a PV string;
    at least one power cabinet comprising at least one DC-to-DC power converter to receive DC power from the PV string and provide regulated DC power to an electrolyzer stack, the regulated DC power having regulated output current and/or voltage; and at least one controller to control the at least one DC-to-DC power converter to match the regulated DC power to requirements of the electrolyzer stack.

8. The system of claim 7, wherein each DC-to-DC power converter is electrically isolated from input to output to protect the electrolyzer stack.

9. The system of claim 7, wherein the at least one power cabinet includes N+M DC-to-DC power converters, wherein N is a minimum number of DC-to-DC power converters needed to meet a desired power rating and M comprises a number of additional units to provide excess capacity in case the plurality of PV modules cannot deliver full power.

10. The system of claim 7, wherein each DC-to-DC power converter includes or is coupled to a Ground Fault Detector/Interrupter (GFDI).

11. The system of claim 7, wherein the at least one DC-to-DC power converter comprises a Maximum Power Point Tracking (MPPT) controller and provides the regulated DC power using droop control.

12. The system of claim 7, further comprising alternate energy storage coupled to the at least one power cabinet to provide continuous power to the electrolyzer stack when sunlight is not available, wherein the alternate energy storage includes at least one of a battery, a flywheel, a thermal power storage unit, and a gravity power storage unit.

13. A system for controlling a photovoltaic (PV)-powered hydrogen production plant comprising:
a plurality of PV modules to receive sunlight and output DC power, wherein the at least two PV modules are combined in series as a PV string;
a plurality of PV combiners receive DC power from at least two PV modules of the plurality of PV modules and output combined DC power;
at least one PV re-combiner to receive combined DC power from at least two PV combiners of the plurality of PV combiners and output re-combined DC power;
at least one power cabinet comprising at least one DC-to-DC power converter to receive re-combined DC power from the at least one PV re-combiner and provide regulated DC power to an electrolyzer stack, the regulated DC power having regulated output current and/or voltage; and
at least one controller to control the at least one DC-to-DC power converter to match the regulated DC power to requirements of the electrolyzer stack.

14. The system of claim 13, wherein each DC-to-DC power converter of the at least one power cabinet is coupled to a common Ground Fault Detector/Interrupter (GFDI).

15. The system of claim 13, wherein each DC-to-DC power converter is electrically isolated from input to output to protect the electrolyzer stack.

16. The system of claim 13, wherein the at least one power cabinet includes N+M DC-to-DC power converters, wherein N is a minimum number of DC-to-DC power converters needed to meet a desired power rating and M comprises a number of additional units to provide excess capacity in case the plurality of PV modules cannot deliver full power.

17. The system of claim 13, wherein:
the at least one DC-to-DC power converter comprises a Maximum Power Point Tracking (MPPT) controller; and
the at least one DC-to-DC power converter provides the regulated DC power using droop control.

18. The system of claim 13, further comprising alternate energy storage coupled to the at least one power cabinet to provide continuous power to the electrolyzer stack when sunlight is not available.

19. The system of claim 18, wherein the alternate energy storage includes at least one of a battery, a flywheel, a thermal power storage unit, and a gravity power storage unit.

* * * * *